(12) United States Patent
Altemeier (10) Patent No.: US 9,789,832 B2
(45) Date of Patent: Oct. 17, 2017

(54) UTILITY VEHICLE HITCH PLATE SYSTEM

(71) Applicant: Mark Altemeier, Maineville, OH (US)

(72) Inventor: Mark Altemeier, Maineville, OH (US)

( * ) Notice: Subject to any disclaimer, the term of this patent is extended or adjusted under 35 U.S.C. 154(b) by 0 days.

(21) Appl. No.: 15/295,515

(22) Filed: Oct. 17, 2016

(65) Prior Publication Data

US 2017/0028952 A1 Feb. 2, 2017

Related U.S. Application Data

(63) Continuation of application No. 14/627,488, filed on Feb. 20, 2015, now Pat. No. 9,499,019.

(60) Provisional application No. 61/943,082, filed on Feb. 21, 2014.

(51) Int. Cl.
| | |
|---|---|
| *B60R 9/06* | (2006.01) |
| *B60D 1/48* | (2006.01) |
| *B60R 19/02* | (2006.01) |
| *B60D 1/56* | (2006.01) |

(52) U.S. Cl.
CPC ............ *B60R 19/023* (2013.01); *B60D 1/485* (2013.01); *B60D 1/565* (2013.01); *B60R 9/06* (2013.01)

(58) Field of Classification Search
CPC ........... B60D 1/485; B60R 9/06; B60R 9/065; B60R 9/08

USPC .......................................... 280/762, 769, 770
See application file for complete search history.

(56) References Cited

U.S. PATENT DOCUMENTS

| | | |
|---|---|---|
| 3,720,333 A | 3/1973 | Vaughn |
| 4,593,840 A | 6/1986 | Chown |
| 5,310,100 A | 5/1994 | Liscinsky |
| 5,620,198 A | 4/1997 | Borchers |
| 6,155,587 A | 12/2000 | Milazzo |
| 6,378,748 B1 | 4/2002 | Cox |
| 6,742,799 B1 | 6/2004 | Hansen |
| 2008/0251556 A1 | 10/2008 | Ayers |
| 2009/0091101 A1 | 4/2009 | Leonard et al. |

OTHER PUBLICATIONS

Office Action of Apr. 6, 2016, filed in U.S. Appl. No. 14/627,488.
Office Action of Oct. 14, 2015, filed in U.S. Appl. No. 14/627,488.

*Primary Examiner* — Frank Vanaman
(74) *Attorney, Agent, or Firm* — Dinsmore & Shohl LLP (57) ABSTRACT

A hitch plate includes a hitch plate body having a heightwise extending portion sized and configured to extend alongside a rear of a utility vehicle and a lengthwise extending portion sized and configured to extend underneath the utility vehicle. The hitch plate further includes a male receiver hitch portion extending outwardly from the heightwise extending portion of the hitch plate body over the lengthwise extending portion of the hitch plate body and a female receiver hitch portion extending outwardly from the heightwise extending portion of the hitch plate body in a direction opposite the male receiver hitch portion.

20 Claims, 6 Drawing Sheets

UTILITY VEHICLE HITCH PLATE SYSTEM

CROSS REFERENCE TO RELATED APPLICATIONS

This application is a continuation of U.S. patent application Ser. No. 14/627,488, filed on Feb. 20, 2015 and entitled "Utility Vehicle Hitch Plate System." Further, this application claims the benefit of and priority to U.S. Provisional Application No. 61/943,082, filed Feb. 21, 2014, the details of which are incorporated by reference in their entirety.

TECHNICAL FIELD

The present specification generally relates to hitch plates and, more particularly, to hitch plates configured to be coupled to a utility vehicle.

BACKGROUND

Vehicle hitches are used to couple a towed element to the vehicle. Some vehicle hitches may be difficult to access because they are positioned underneath a vehicle, which may cause difficulties when coupling an implement to the vehicle hitch. Further, vehicle components may be exposed to a ground surface that extends underneath the vehicle. The ground surface may include uneven or loose terrain that may contact the underside and/or the rear of the vehicle.

Accordingly, hitch plates may be desired to provide protection to the underside of the vehicle and to provide a convenient coupling location to couple a towable and/or mountable apparatus to the vehicle.

SUMMARY

In one embodiment, a hitch plate includes a hitch plate body having a heightwise extending portion sized and configured to extend alongside a rear of a utility vehicle and a lengthwise extending portion sized and configured to extend underneath the utility vehicle. The hitch plate further includes a male receiver hitch portion extending outwardly from the heightwise extending portion of the hitch plate body over the lengthwise extending portion of the hitch plate body and a female receiver hitch portion extending outwardly from the heightwise extending portion of the hitch plate body in a direction opposite the male receiver hitch portion.

In another embodiment, a utility vehicle system includes a utility vehicle and a hitch plate coupled to the utility vehicle at a rear of the utility vehicle. The hitch plate includes a hitch plate body having a heightwise extending portion sized and configured to extend alongside the rear of the utility vehicle and a lengthwise extending portion sized and configured to extend underneath the utility vehicle. The hitch plate further includes a female receiver hitch portion extending outwardly from the heightwise extending portion of the hitch plate body in a direction opposite the rear of the utility vehicle.

In yet another embodiment, a utility vehicle system includes a utility vehicle having a vehicle mounted receiver hitch and a hitch plate coupled to the utility vehicle. The hitch plate includes a hitch plate body having a heightwise extending portion sized and configured to extend alongside a rear of the utility vehicle and a lengthwise extending portion sized and configured to extend underneath the utility vehicle. The hitch plate further includes a female receiver hitch portion extending outwardly from the heightwise extending portion of the hitch plate body and a male receiver hitch portion including a vehicle hitch engaging portion, the male receiver hitch portion extending outwardly from the heightwise extending portion of the hitch plate body in a direction opposite the female receiver hitch portion. Further, the hitch plate is coupled to the utility vehicle using a first mounting arrangement, a second mounting arrangement, and a third mounting arrangement. The first mounting arrangement includes coupling the vehicle hitch engaging portion of the male receiver hitch portion to the vehicle mounted receiver hitch of the utility vehicle, the second mounting arrangement includes coupling the hitch plate body to the utility vehicle by extending one or more fasteners through one or more mounting holes of the hitch plate body, and the third mounting arrangement includes coupling a support flange to a support structure of the rear of the utility vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to hitch plates configured to be coupled to a utility vehicle. The hitch plates may extend along both the rear and the underside of the utility vehicle and may provide a coupling location for one or more mountable apparatuses to be coupled to the utility vehicle when the hitch plate is also coupled to the utility vehicle.

Figure 1:
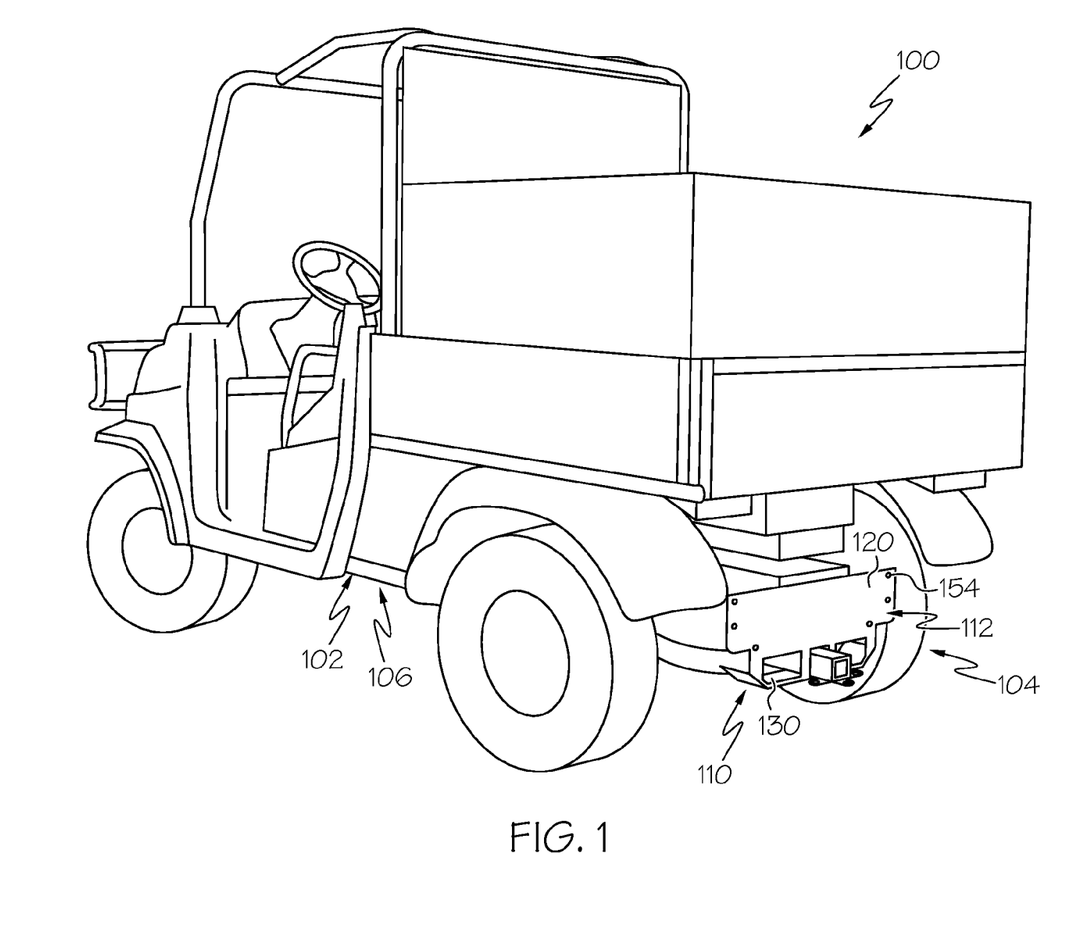
FIG. 1 depicts an isometric rear view of an example utility vehicle having a hitch plate coupled thereto according to one or more embodiments described herein.
Figure 2:
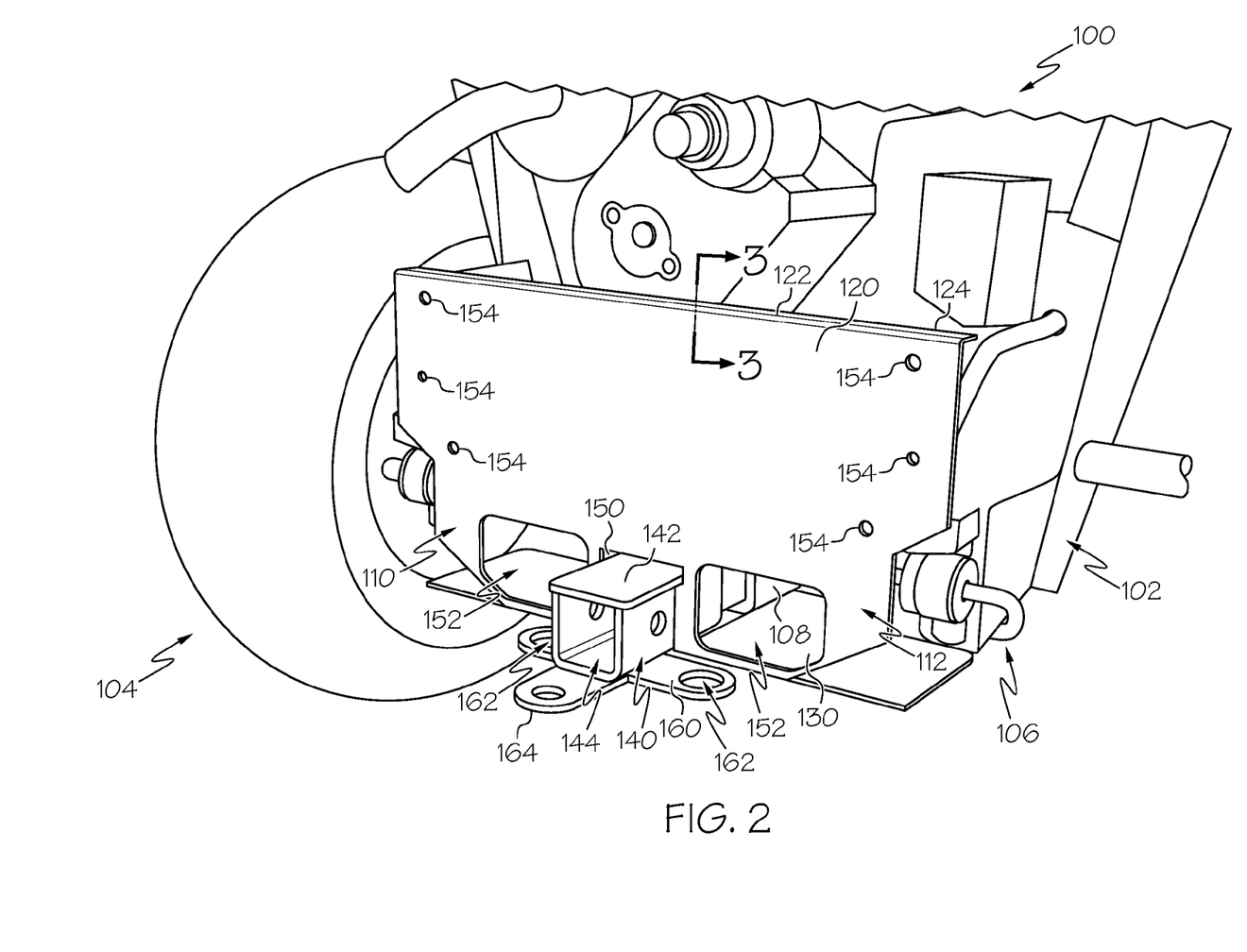
FIG. 2 depicts an isometric rear view of a rear of the utility vehicle of FIG. 1 having a hitch plate coupled thereto according to one or more embodiments described herein.

Referring now to FIGS. 1-2, a utility vehicle 100 and a hitch plate 110 are depicted. In some embodiments, the utility vehicle 100 comprises a vehicle frame 102, an underside 106, and a rear 104. The utility vehicle 100 may be any exemplary vehicle, such as, for example, a tractor, a truck, an off-road vehicle, an all-terrain vehicle, a cart, or the like, such as, in one exemplary embodiment, a Kubota™ RTV-5. The vehicle frame 102 may be any exemplary frame structure, such as, for example, a ladder frame, a backbone tube frame, an x-frame, a perimeter frame, a platform frame, a unibody frame, or the like. In some embodiments, the utility vehicle 100 comprises a vehicle mounted receiver hitch 108 (FIG. 2) configured to provide a mounting location for one or more mountable apparatuses, such as a trailer, or the like. The hitch plate 110 may be coupled to the utility vehicle 100, for example, at the rear 104 of the utility vehicle 100. In some embodiments, the hitch plate 110 may be coupled to the vehicle mounted receiver hitch 108 and, in other embodiments, the hitch plate 110 may be coupled to the utility vehicle 100 without coupling the hitch plate 110 to the vehicle mounted receiver hitch 108. For example, the hitch plate 110 may be mounted at the rear 104 of an example utility vehicle 100 that does not include the vehicle mounted receiver hitch 108 using mounting holes 154.

Figure 3:
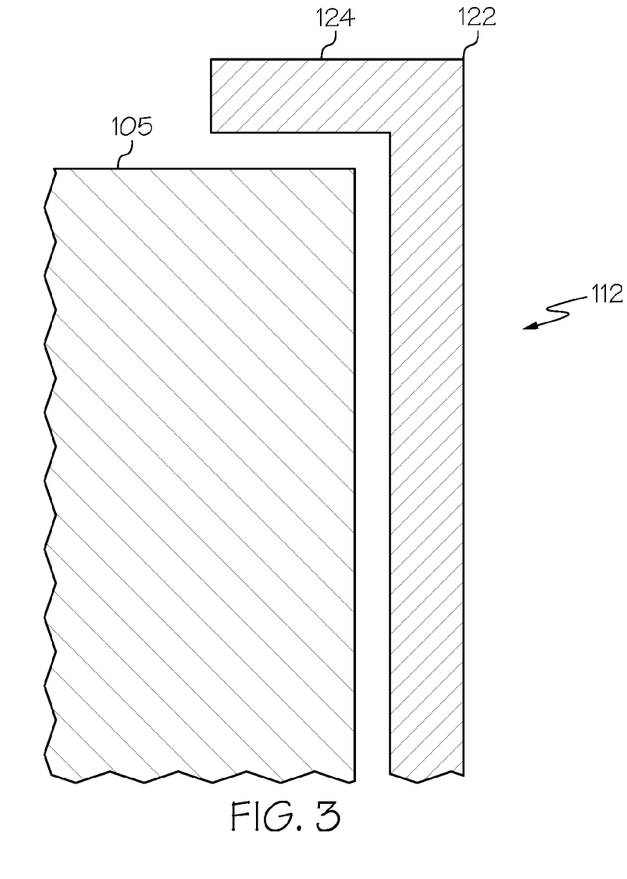
FIG. 3 depicts a schematic section view along line 3-3 of FIG. 2 according to one or more embodiments described herein.
Figure 4:
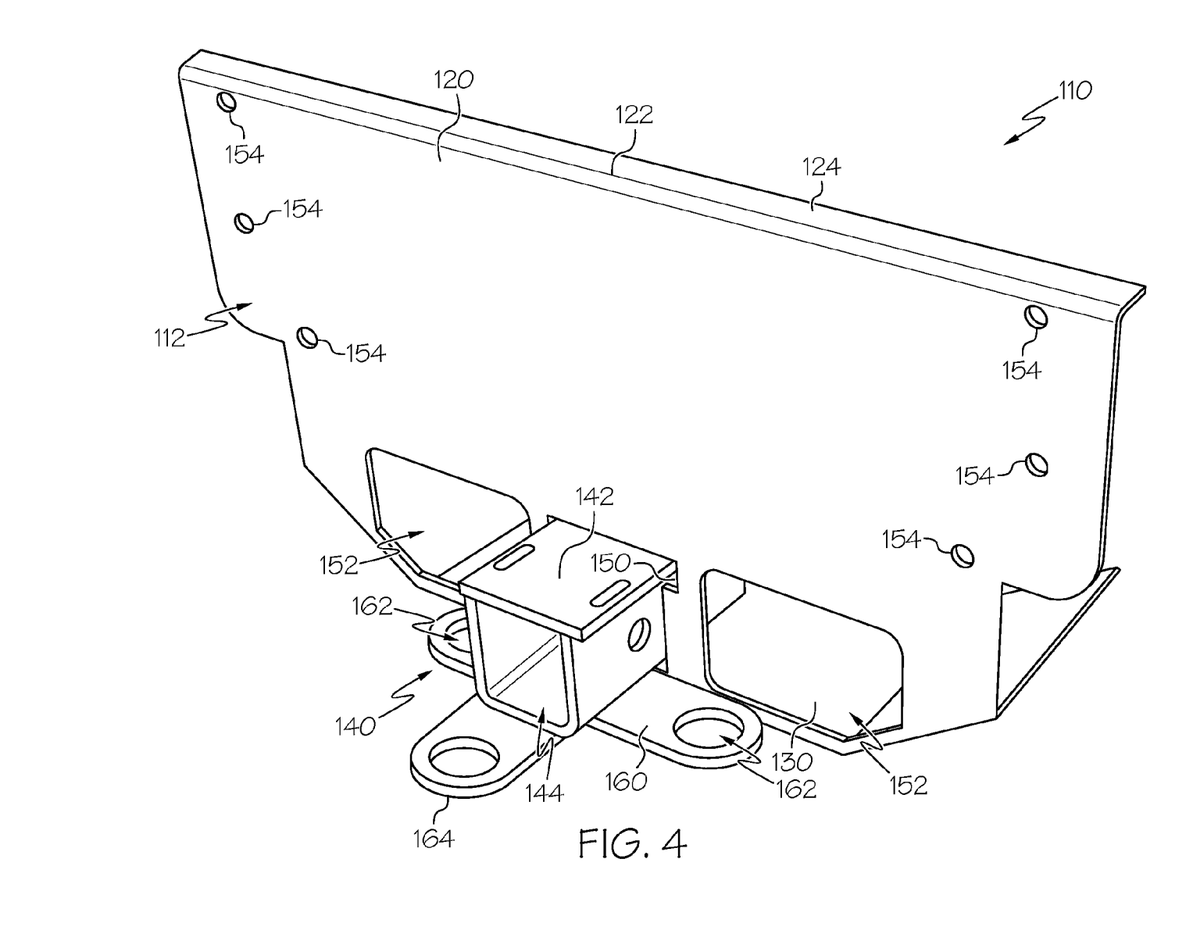
FIG. 4 depicts an isometric rear view of the hitch plate of FIG. 2 according to one or more embodiments described herein.

Referring to FIGS. 2-4, the hitch plate 110 includes a hitch plate body 112 comprising a heightwise extending portion 120 and a lengthwise extending portion 130. The hitch plate 110 may comprise a variety of materials, for example metal, plastic, fiberglass, and the like. The heightwise extending portion 120 may be sized and configured to extend alongside and proximate the rear 104 of the utility vehicle 100, terminating at an end 122 of the heightwise extending portion 120. In some embodiments, the heightwise extending portion 120 may extend along the rear 104 of the utility vehicle 100 at a position located outward from the vehicle mounted receiver hitch 108. For example, the heightwise extending portion 120 may be spaced apart from the vehicle mounted receiver hitch 108 about 5-12 inches, for example, 7 in, 8 in, 10 in, or the like. Additionally, the heightwise extending portion 120 may include a support flange 124 positioned at the end 122 of the heightwise extending portion 120. The support flange 124 may be integral with or coupled to the heightwise extending portion 120 and may be angled with respect to the heightwise extending portion 120. The support flange 124 may be any length, for example, ½ in, 1 in, 2 in, 5 in, or the like. In some embodiments, as depicted in FIG. 3, the support flange 124 may provide a mounting location for mounting the hitch plate 110 to the rear 104 of the utility vehicle 100. For example, the support flange 124 may be sized and configured to engage with a support structure located at the rear 104 of the utility vehicle 100, such as the shelf portion 105 depicted in FIG. 3. The support flange 124 may rest on the shelf portion 105 such that contact between the support flange 124 and the shelf portion 105 may support the weight of the hitch plate 110.

Referring particularly to FIG. 4, the heightwise extending portion 120 may also include one or more mounting holes 154 disposed through the heightwise extending portion 120 to provide a connection location for coupling the hitch plate 110 to the rear 104 of the utility vehicle 100. The mounting holes 154 may be positioned proximate one or more fastening locations of the utility vehicle 100 when the hitch plate 110 is proximate the utility vehicle 100. The fastening locations of the utility vehicle 100 are configured to engage with a fastening device, such as a bolt, screw, pin, or the like, and may be positioned at any location of the utility vehicle 100, for example, the vehicle frame 102 (FIG. 1). Further, one or more fastening devices may be disposed through the one or more mounting holes 154 to couple the hitch plate 110 to the utility vehicle 100. In some embodiments, the heightwise extending portion 120 may be sized and configured to extend along and couple to the rear 104 of a particular utility vehicle 100, for example, a Kubota™ RTV-5. In this embodiment, the mounting holes 154 are positioned in locations proximate one or more fastening locations of the particular utility vehicle 100 such that the heightwise extending portion 120 may be fastened to the particular utility vehicle 100. Additionally, the heightwise extending portion 120 may include one or more access holes 152 disposed through heightwise extending portion 120. The access holes 152 are arranged and configured to allow a user to reach through the hitch plate body 112, for example, to reach the vehicle mounted receiver hitch 108 of the utility vehicle 100.

Figure 5:
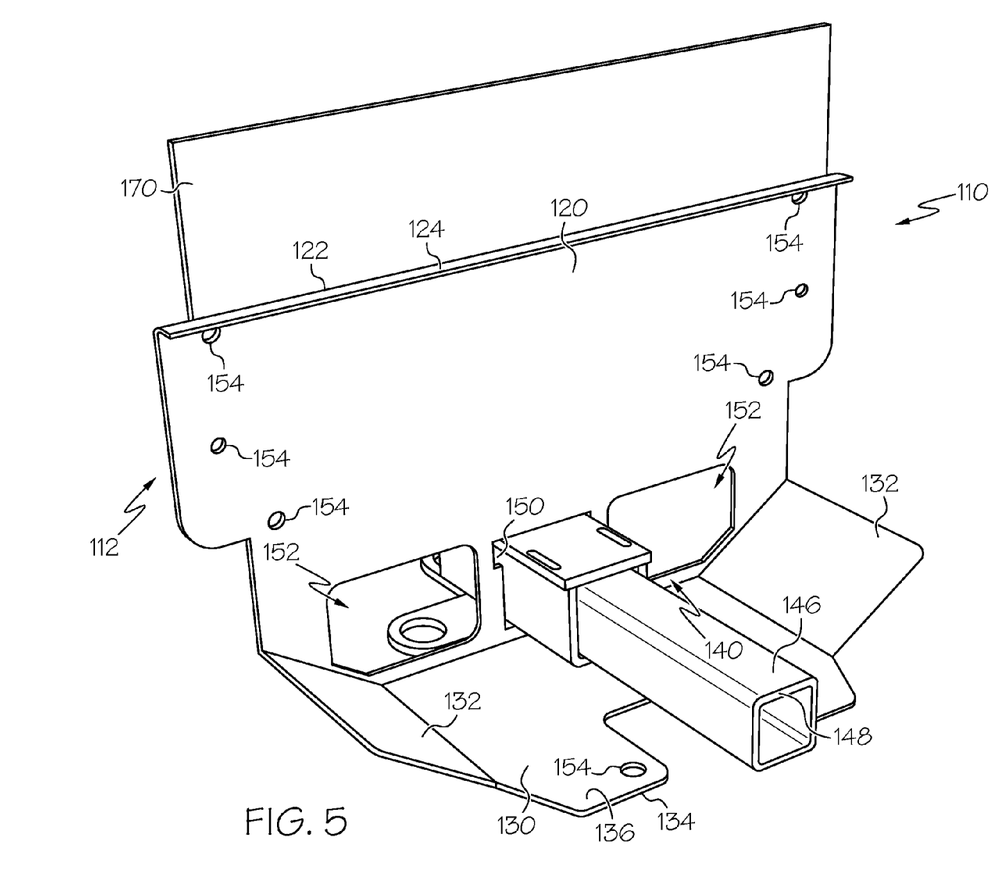
FIG. 5 depicts an isometric front view of the hitch plate of FIG. 4 according to one or more embodiments described herein.

Referring to FIG. 5, the lengthwise extending portion 130 of hitch plate body 112 is depicted. The lengthwise extending portion 130 may be sized and configured to extend underneath the utility vehicle 100, alongside and proximate the underside 106 of the utility vehicle 100, terminating at an end 134 of the lengthwise extending portion 130. The lengthwise extending portion 130 may include one or more angled portions 132 and a central portion 136 adjacent at least one angled portion 132. In some embodiments, for example, the embodiments depicted in FIG. 4, the central portion 136 is disposed between multiple angled portions 132. In other embodiments, the lengthwise extending portion 130 does not include an angled portion 132. Further, one or more mounting holes 154 and one or more access holes 152, as described above with respect to the heightwise extending portion 120, may be disposed through the lengthwise extending portion 130. Additionally, the lengthwise extending portion 130 may be sized and configured to extend along and couple to the underside 106 of a particular utility vehicle 100, for example, a Kubota™ RTV-5.

Referring again to FIGS. 1-5, when the hitch plate 110 is coupled to the utility vehicle 100, the heightwise extending portion 120 may provide a covering for the components of the utility vehicle 100 positioned along the rear 104 of the utility vehicle 100 and the lengthwise extending portion 130 may provide a covering for the components of the utility vehicle 100 positioned along the underside 106 of the utility vehicle 100. In some embodiments, the hitch plate 110 may cover a transmission valve of the utility vehicle 100. In some embodiments, the hitch plate body 112 further comprises one or more contoured portions positioned proximate one or more components of the utility vehicle 100 that extend outward and protrude from the rear 104, the underside 106, and/or other portions of the utility vehicle 100. Further, the heightwise extending portion 120 and the lengthwise extending portion 130 provide contact surfaces for contact with a ground surface, for example, when the utility vehicle 100 is traveling. Further, the heightwise extending portion 120 and the lengthwise extending portion 130 may provide a skid plate, such that the ground surface, debris, or the like, may contact the heightwise extending portion 120 and/or the lengthwise extending portion 130 and not contact the rear 104 and/or the underside 106 of the utility vehicle 100.

Referring now to FIGS. 2, 4, and 5, the hitch plate 110 further comprises a receiver hitch extension 140 having a male receiver hitch portion 146 (FIG. 4), a female receiver hitch portion 142 (FIGS. 2 and 3), or both. The female receiver hitch portion 142 extends outwardly from the heightwise extending portion 120 of the hitch plate body 112 and the male receiver hitch portion 146 extends over the lengthwise extending portion 130 of the hitch plate body 112. In some embodiments, both the female receiver hitch portion 142 and the male receiver hitch portion 146 extend over the lengthwise extending portion of the hitch plate body 112. The receiver hitch extension 140 may be coupled to the heightwise extending portion 120 using any coupling technique, for example, fastening, welding, or the like. The female receiver hitch portion 142 extends outwardly from the heightwise extending portion 120 of the hitch plate body 112 in a direction opposite the male receiver hitch portion 146. In some embodiments, the female receiver hitch portion 142 may be coupled to the heightwise extending portion 120 using any coupling technique, for example, fastening, welding, or the like. In some embodiments, the male receiver hitch portion 146 is coupled to the female receiver hitch portion 142 such that the receiver hitch extension 140 extends through a receiver hitch cutout portion 150 of the hitch plate body 112. In other embodiments, the male receiver hitch portion 146 and/or the female receiver hitch portion 142 may be coupled to the hitch plate body 112 without extending through the hitch plate body 112. Further, in some embodiments, the receiver hitch extension 140 comprises only a male receiver hitch portion 146 and in other embodiments the receiver hitch extension 140 comprises only a female receiver hitch portion 142.

Referring to FIGS. 2 and 4, the hitch plate 110 including the female receiver hitch portion 142 is depicted. In this embodiment, the female receiver hitch portion 142 extends outwardly from the heightwise extending portion 120 of the hitch plate body 112. In some embodiments, the female receiver hitch portion 142 is coupled to the heightwise extending portion 120, for example, abutting the heightwise extending portion 120. When the hitch plate 110 is coupled to the utility vehicle 100, the female receiver hitch portion 142 may extend outward from the rear 104 of the utility vehicle 100 and may extend beyond the vehicle frame 102 and, in some embodiments, beyond the rear 104 of the utility vehicle 100. Further, the female receiver hitch portion 142 terminates outwardly from the heightwise extending portion 120 at a linkage location 144. The linkage location 144 may provide a coupling location for one or more mountable apparatuses, for example, a trailer or the like. The female receiver hitch portion 142 may be configured to support a mountable apparatus within any trailer hitch weight class, for example, Class I, II, III, IV, and V. Further, in some example utility vehicles 100, the vehicle mounted receiver hitch 108 is positioned along the underside 106 of the utility vehicle 100, for example, about 5-12 inches inward from the rear 104 of the utility vehicle 100. When using these example utility vehicles 100, it may be difficult to properly couple a mountable apparatus to the vehicle mounted receiver hitch 108 without striking the rear 104 or the vehicle frame 102 with the mountable apparatus, potentially causing damage. To solve this problem, the hitch plate 110 includes the female receiver hitch portion 142 having a linkage location 144 extended outward from the rear 104 of the utility vehicle 100, providing an accessible mounting location for one or more mountable apparatuses.

In some embodiments, the female receiver hitch portion 142 may further comprise a female receiver hitch flange 160 coupled to the female receiver hitch portion 142, for example, to an underside of the female receiver hitch portion 142. The female receiver hitch flange 160 may include one or more female receiver hitch flange holes 162. In some embodiments, the female receiver hitch flange 160 may include a flange extension 164 that extends beyond the linkage location 144 of the female receiver hitch portion 142 and may include additional pin holes positioned in the flange extension 164. Further, the flange extension 164 may comprise a duckbill shape, a tapered shape, or the like. In operation, when a mountable apparatus is coupled to the hitch plate 110 at the linkage location 144 of the female receiver hitch portion 142, a locking element, for example, a chain, a pin, or the like, may extend through the female receiver hitch flange holes 162 and/or any additional pin holes to provide secondary coupling between the female receiver hitch portion 142 and the mountable apparatus.

Referring now to FIG. 5, the hitch plate 110 including the male receiver hitch portion 146 is depicted. The male receiver hitch portion 146 extends outwardly from the heightwise extending portion 120 of the hitch plate body 112 over the lengthwise extending portion 130 of the hitch plate body 112. In particular, the male receiver hitch portion 146 may extend over the central portion 136 of the lengthwise extending portion 130. In some embodiments, the male receiver hitch portion 146 is coupled to the heightwise extending portion 120, for example, abutting the heightwise extending portion 120. In other embodiments, the male receiver hitch portion 146 extends through the receiver hitch cutout portion 150 disposed in the heightwise extending portion of the hitch plate body 112. Further, the male receiver hitch portion 146 terminates outwardly from the heightwise extending portion 120 of the hitch plate body 112 at a utility vehicle hitch engaging portion 148. The utility vehicle hitch engaging portion 148 of the male receiver hitch portion 146 is engageable with the vehicle mounted receiver hitch 108 of the utility vehicle 100 (FIG. 2). In some embodiments, the hitch plate 110 may be coupled to the utility vehicle 100 by coupling the male receiver hitch portion 146 of the hitch plate 110 with the vehicle mounted receiver hitch 108 of the utility vehicle 100.

In some embodiments, the hitch plate 110 may coupled to the utility vehicle 100 using multiple mounting arrangements. For example, in an exemplary embodiment, a first mounting arrangement may comprise coupling the utility vehicle hitch engaging portion 148 of the male receiver hitch portion 146 to the vehicle mounted receiver hitch 108 of the utility vehicle 100, a second mounting arrangement may comprise fastening the hitch plate body 112 to the utility vehicle 100 by extending one or more fasteners through one or more mounting holes 154 of the hitch plate body 112, and the third mounting arrangement may comprise coupling a support flange 124 to a support structure of the rear 104 of the utility vehicle 100. In some embodiments, each mounting arrangement may be disposed at a different position in the heightwise direction along the hitch plate 110. For example, the first mounting arrangement may be located below the second mounting arrangement and both the first mounting arrangement and the second mounting arrangement may be positioned below the third mounting arrangement. By mounting the hitch plate 110 to the utility vehicle 100 using a combination of coupling arrangements at different heightwise positions, the load and the torque applied to each mounting arrangement may be reduced. This may improve the strength and stability of the hitch plate 110 when the hitch plate 110 is mounted to the utility vehicle 100 and may also improve the strength and stability of an engagement between the hitch plate 110 and a mountable apparatus. It should be understood that any combination of coupling methods are contemplated.

Referring still to FIG. 5, the hitch plate 110 may further comprise an auxiliary plate 170 coupled to the heightwise extending portion 120 and/or the lengthwise extending portion 130 of the hitch plate body 112. In some embodiments, auxiliary plate 170 may be coupled to the heightwise extending portion 120 and extend beyond the end 122 of the heightwise extending portion 120 of the hitch plate body 112. In some embodiments, the auxiliary plate 170 may be coupled to the lengthwise extending portion 130 and extend beyond an end 134 of the lengthwise extending portion 130 of the hitch plate body 112. The auxiliary plate 170 may be coupled to the hitch plate body 112 using any coupling method, for example, fastening, welding, or the like. In some embodiments, the auxiliary plate 170 may be coupled to the hitch plate body 112 using the mounting holes 154 of the hitch plate body 112. Further, the auxiliary plate 170 may be coupled directly to the utility vehicle 100 without being coupled to the hitch plate body 112. For example, the auxiliary plate 170 may be coupled to a factory provided guard plate of the utility vehicle 100. Further, when the auxiliary plate 170 is coupled to the hitch plate body 112 and the utility vehicle 100, the auxiliary plate 170 may provide an additional mounting arrangement between the hitch plate 110 and the utility vehicle 100.

Figure 6:
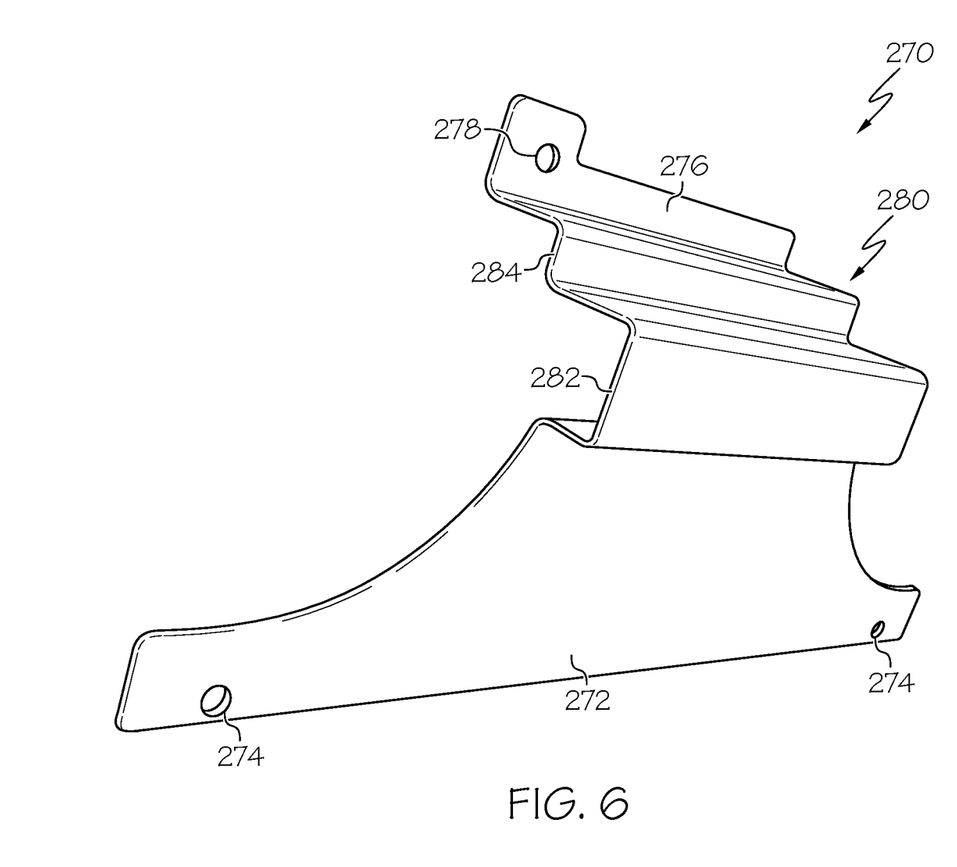
FIG. 6 depicts an example auxiliary plate of the hitch plate according to one or more embodiments shown described herein.

Referring now to FIG. 6, another example auxiliary plate 270 is depicted. The auxiliary plate 270 includes a hitch plate coupling portion 272 having hitch plate coupling holes 274 and a utility vehicle coupling portion 276 having utility vehicle coupling holes 278. The auxiliary plate 270 may be coupled to the hitch plate 110 using the hitch plate coupling portion 272, for example, by extending fasteners through the hitch plate coupling holes 274 of the auxiliary plate 270 and the mounting holes 154 of the heightwise extending portion 120. Further, the auxiliary plate 270 may be coupled to the utility vehicle 100 at the utility vehicle coupling portion 276, for example, by extending fasteners through the utility vehicle coupling holes 278. The auxiliary plate 270 also includes a stairstep portion 280 having one or more outward step portions 282 and one or more inward step portions 284. The outward step portions 282 extend away from the rear 104 of the utility vehicle 100 to are sized to cover vehicle components extending outward from the rear 104, for example, a transmission cover plate, a transmission valve, a transmission knob portion, or any other outwardly extending components. The one or more inward step portions 284 extend towards the rear 104 of the utility vehicle 100 such that, for example, the one or more inward step portions 284 do not obstruct a tilting path of a utility vehicle dump bed. Further, when the auxiliary plate 270 is coupled to the hitch plate body 112 and the utility vehicle 100, the auxiliary plate 270 may provide an additional mounting arrangement between the hitch plate 110 and the utility vehicle 100.

It should now be understood that hitch plates may be mounted to utility vehicles to provide a barrier between a ground surface and portions of the utility vehicle. The hitch plates may include a lengthwise extending portion that extends along an underside of the utility vehicle and a heightwise extending portion that extends along a rear of the utility vehicle. The hitch plates further include a receiver hitch extension having a male receiver hitch portion, a female receiver hitch portion, or both. The male receiver hitch portion may provide a mounting location between the utility vehicle and the hitch plate and the female receiver hitch portion may provide a coupling location for one or more mountable apparatuses to be coupled to the hitch plate. Further, the hitch plates may be mounted to the utility vehicles using a variety of coupling methods.

It is noted that the term "substantially" may be utilized herein to represent the inherent degree of uncertainty that may be attributed to any quantitative comparison, value, measurement, or other representation. This term is also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A hitch plate comprising:
   a hitch plate body comprising:
      a heightwise extending portion sized and configured to extend alongside a rear of a utility vehicle;
      a lengthwise extending portion sized and configured to extend underneath the utility vehicle;
   a male receiver hitch portion extending outwardly from the heightwise extending portion of the hitch plate body over the lengthwise extending portion of the hitch plate body; and
   a female receiver hitch portion extending outwardly from the heightwise extending portion of the hitch plate body in a direction opposite the male receiver hitch portion;
   wherein:
      the heightwise extending portion of the hitch plate body and the lengthwise extending portion of the hitch plate body are connected at a coupling location; and
      the heightwise extending portion of the hitch plate body extends beyond the male receiver hitch portion and the female receiver hitch portion in a widthwise direction at the coupling location and at an end of the heightwise extending portion of the hitch plate body.

2. The hitch plate of claim 1, wherein the female receiver hitch portion terminates outwardly from the heightwise extending portion of the hitch plate body at a linkage location sized and configured to engage a mountable apparatus.

3. The hitch plate of claim 1, wherein the male receiver hitch portion terminates outwardly from the heightwise extending portion of the hitch plate body at a utility vehicle hitch engaging portion sized and configured to engage a vehicle mounted receiver hitch.

4. The hitch plate of claim 1, wherein the end of the heightwise extending portion of the hitch plate body further comprises a support flange sized and configured to engage a support structure of a rear of a utility vehicle.

5. The hitch plate of claim 1 further comprising one or more access holes disposed through the heightwise extending portion of the hitch plate, the lengthwise extending portion of the hitch plate, or both.

6. The hitch plate of claim 1, wherein the heightwise extending portion of the hitch plate body further comprises a receiver hitch cutout portion.

7. The hitch plate of claim 6, wherein the male receiver hitch portion is coupled to the female receiver hitch portion forming a receiver hitch extension extending through the receiver hitch cutout portion of the heightwise extending portion.

8. The hitch plate of claim 1 further comprising an auxiliary plate coupled to the heightwise extending portion of the hitch plate, wherein the auxiliary plate extends beyond the end of the heightwise extending portion.

9. The hitch plate of claim 1 further comprising one or more female receiver hitch locking flanges extending from the female receiver hitch portion.

10. The hitch plate of claim 1, wherein the lengthwise extending portion of the hitch plate body extends beyond the male receiver hitch portion and the female receiver hitch portion in the widthwise direction at the coupling location and at an end of the lengthwise extending portion of the hitch plate body.

11. A utility vehicle system comprising:
a utility vehicle; and
a hitch plate coupled to the utility vehicle at a rear of the utility vehicle, the hitch plate comprising:
   a hitch plate body comprising:
      a heightwise extending portion extending alongside the rear of the utility vehicle;
      a lengthwise extending portion extending underneath the utility vehicle; and
   a female receiver hitch portion extending outwardly from the heightwise extending portion of the hitch plate body in a direction opposite the rear of the utility vehicle; wherein:
      the heightwise extending portion of the hitch plate body and the lengthwise extending portion of the hitch plate body are connected at a coupling location;
      the heightwise extending portion of the hitch plate body extends beyond the male receiver hitch portion and the female receiver hitch portion in a widthwise direction at the coupling location and at an end of the heightwise extending portion of the hitch plate body; and
      the lengthwise extending portion of the hitch plate body extends beyond the male receiver hitch portion and the female receiver hitch portion in the widthwise direction at the coupling location and at an end of the lengthwise extending portion of the hitch plate body.

12. The utility vehicle system of claim 11 further comprising a male receiver hitch portion extending outwardly from the heightwise extending portion of the hitch plate body over the lengthwise extending portion.

13. The utility vehicle system of claim 12, wherein the male receiver hitch portion terminates at a vehicle hitch engaging portion engageable with a vehicle mounted receiver hitch of the utility vehicle.

14. The utility vehicle system of claim 11, wherein the female receiver hitch portion extends in a rearward direction beyond the rear of the utility vehicle and terminates outwardly from the heightwise extending portion of the hitch plate body at a linkage location.

15. The utility vehicle system of claim 11 further comprising one or more mounting holes disposed through the hitch plate.

16. The utility vehicle system of claim 15 further comprising one or more fastening devices disposed through the one or more mounting holes of the hitch plate, wherein the one or more fastening devices are engageable with the utility vehicle.

17. The utility vehicle system of claim 11 further comprising an auxiliary plate coupled to the heightwise extending portion of the hitch plate, wherein the auxiliary plate extends beyond the end of the heightwise extending portion.

18. A hitch plate comprising:
a hitch plate body comprising a heightwise extending portion and a lengthwise extending portion;
a male receiver hitch portion extending outwardly from the heightwise extending portion of the hitch plate body over the lengthwise extending portion of the hitch plate body such that the male receiver hitch portion is spaced apart from the lengthwise extending portion of the hitch plate body in a heightwise direction; and
a female receiver hitch portion extending outwardly from the heightwise extending portion of the hitch plate body in a direction opposite the male receiver hitch portion; wherein:
   the heightwise extending portion of the hitch plate body and the lengthwise extending portion of the hitch plate body are connected at a coupling location;
   the heightwise extending portion of the hitch plate body extends beyond the male receiver hitch portion and the female receiver hitch portion in a widthwise direction at the coupling location and at an end of the heightwise extending portion of the hitch plate body; and
   the lengthwise extending portion of the hitch plate body extends beyond the male receiver hitch portion and the female receiver hitch portion in the widthwise direction at the coupling location and at an end of the lengthwise extending portion of the hitch plate body.

19. The hitch plate of claim 18, wherein:
the lengthwise extending portion of the hitch plate body comprises a central portion disposed between two angled portions; and
the male receiver hitch portion extends over the central portion of the lengthwise extending portion of the hitch plate body.

20. The hitch plate of claim 18, wherein:
the female receiver hitch portion terminates outwardly from the heightwise extending portion of the hitch plate body at a linkage location sized and configured to engage a mountable apparatus; and
the male receiver hitch portion terminates outwardly from the heightwise extending portion of the hitch plate body at a utility vehicle hitch engaging portion sized and configured to engage a vehicle mounted receiver hitch.

* * * * *